C. L. NORDEN.
GYROSCOPE STABILIZER.
APPLICATION FILED APR. 15, 1916.

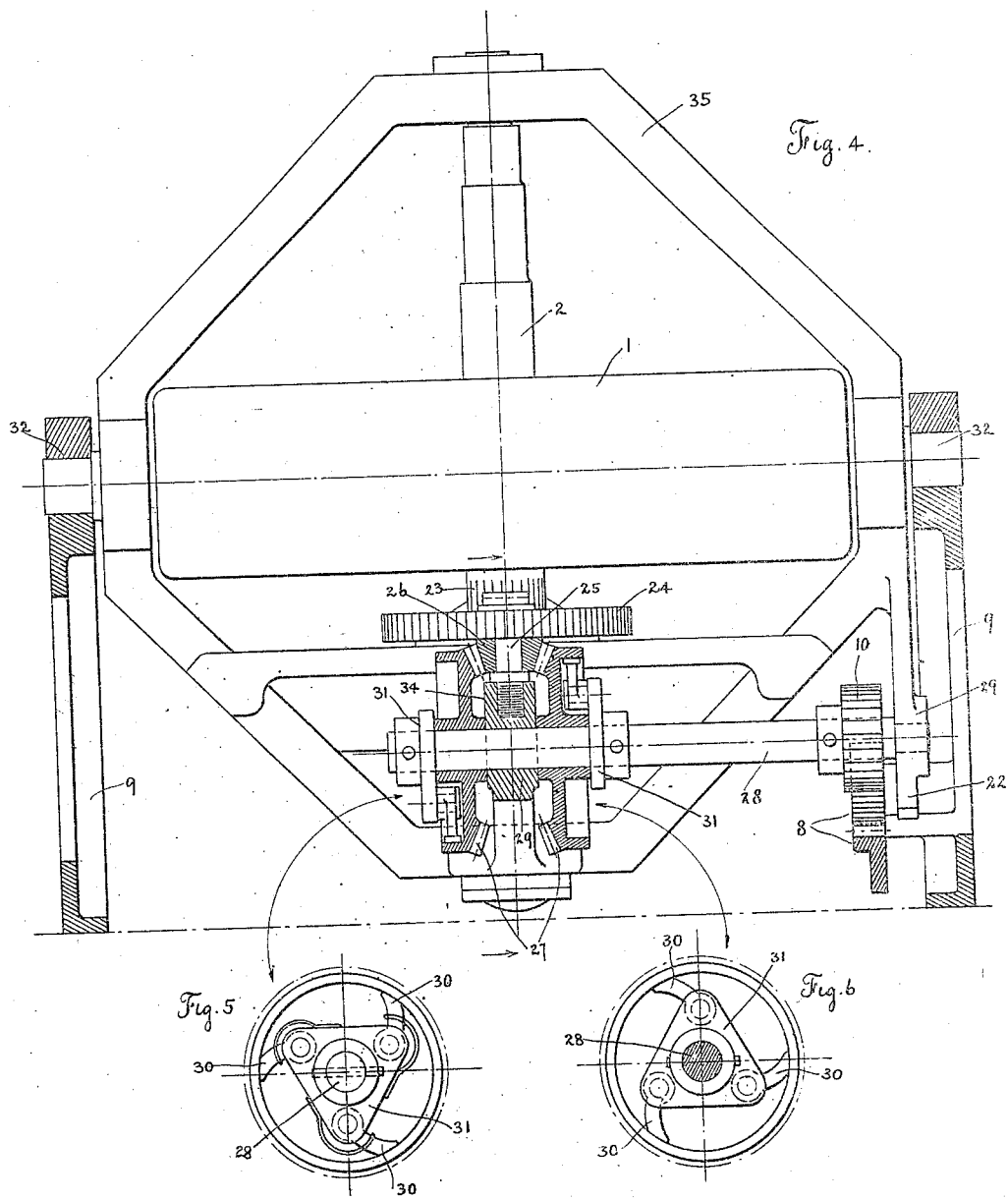

1,236,204.

Patented Aug. 7, 1917.
5 SHEETS—SHEET 5.

INVENTOR
Carl L Norden,
BY
Kenyon & Kenyon
his ATTORNEYS

UNITED STATES PATENT OFFICE.

CARL L. NORDEN, OF BROOKLYN, NEW YORK.

GYROSCOPE-STABILIZER.

1,236,204.

Specification of Letters Patent.

Patented Aug. 7, 1917.

Application filed April 15, 1916. Serial No. 91,302.

*To all whom it may concern:*

Be it known that I, CARL L. NORDEN, a subject of the Queen of the Netherlands, and a resident of the borough of Brooklyn, county of Kings, city and State of New York, have invented certain new and useful Improvements in Gyroscope-Stabilizers, of which the following is a specification.

My improvement relates to apparatus for the control and operation of gyroscopic stabilizers or gyroscopic appliances for quenching or damping or limiting the periodic angular motion of stable bodies subject or liable to oscillation, such as vessels.

It has for its object to provide a new and improved system of control for gyroscopes for stabilizing bodies subject to forces or moments causing oscillation, such as vessels; to simplify and improve such gyroscopic stabilizers and make them more efficient, reliable and durable in operation; also to make the control of such stabilizers automatic and certain, and to eliminate the possibility of such stabilizers getting out of control and thereby to make them safe; to render cheaper the construction and operation of such devices; to lessen their weight and to reduce the space needed for them and their operation; to insure a limit to the angular velocity of precession of the gyroscope and to render such limit adjustable; also to utilize the energy of oscillation derived from the body being stabilized; also to reduce the supervision or adjustment required for such devices; also, under certain conditions, to make such devices self-running and useful as sources of power; and generally to improve in other ways such gyroscopic stabilizers, rendering them more efficient in operation and more capable of commercial use.

My invention consists in the novel devices and combinations hereinafter set forth.

Heretofore gyroscopic stabilizing devices, whether passive or active, have been open to such serious objections and drawbacks in their construction and use as to interfere seriously with their practical application and success. As a result, such apparatus has heretofore had a very limited use, and, in almost all cases where attempts have been made to use it, such attempts have been given up and abandoned as impractical. Among the difficulties encountered are the fact that such prior devices have been too expensive in construction and operation, too cumbersome and heavy, too liable to get beyond control and to be dangerous to life and property, and not efficient and reliable enough for practical purposes. In stabilizers of the active variety, constant supervision and adjustment have always been necessary. The control is very complicated and has had to be adjusted to the conditions of use, such, for instance, as the varying conditions at sea for vessels, and, even with constant supervision and adjustment, such devices have not been sufficiently reliable. They are not self-centering, and are apt to get out of phase with the oscillation of the body to be stabilized and become less efficient. A large space is required for their operation and supervision, and, if the control is purely active, the outside motive power to properly control such apparatus has to be so very great that it is prohibitive under ordinary commercial conditions. If partly active and partly passive, such stabilizers sacrifice the self-centering feature of passive systems, unless complicated apparatus is added to conpensate for it, and have to be provided with all the elements of both control systems, resulting in very complicated apparatus, which will not operate smoothly under varying sea conditions. The large amount of power required to spin the rotor or rotors of any gyroscopic stabilizers used heretofore constitutes a great drawback to their commercial use, and, since all of them destroy, by mechanical, hydraulic, or electric braking, the entire energy taken out of the oscillating body they act upon, means to eliminate the heat thus generated has to be provided.

My invention is addressed to overcoming such difficulties. My improved apparatus is simple and relatively cheap in construction; rugged and durable and requiring little space for its operation; may be pendulic or self-centering; requires little or no outside supervision or adjustment; and is efficient and safe under all conditions. It provides a safe limit for precessional angular velocity; may be designed to be self-running after it has been once fully started; and is capable, under certain conditions, of allowing the use of excess energy derived from the oscillation of the body to be stabilized for external purposes.

In the drawings accompanying this specification and forming part hereof, I have shown my improvement, in a preferred form, as applied to the stabilizing of a vessel, although it may, of course, be used for the purpose of stabilizing other bodies subject to oscillation.

Referring now to the specific embodiment shown in the drawings,

Fig. 4 is a side elevation of the apparatus of Fig. 3, viewed as shown by the arrow in Fig. 3.

Figs. 5 and 6 are detail views of friction pawls and clutches used in the apparatus of Fig. 4.

Figure 1:
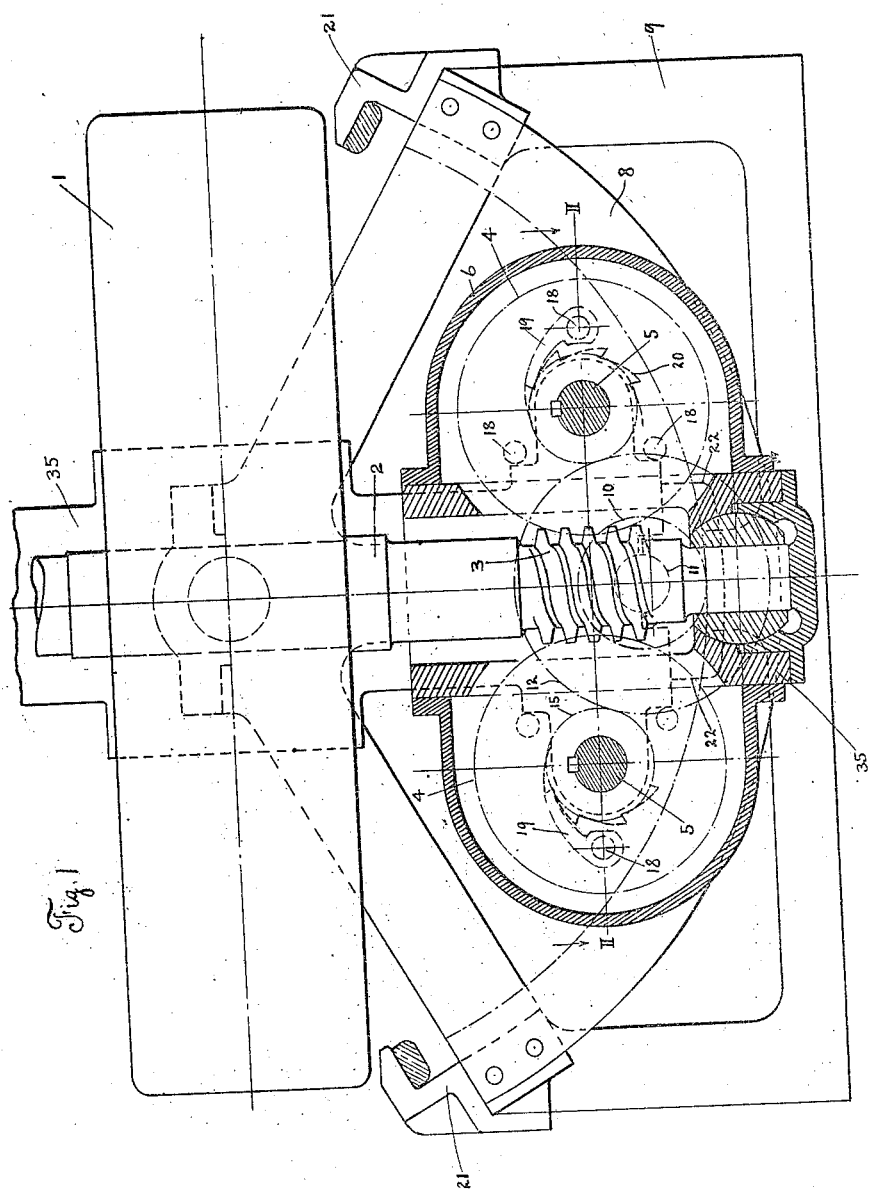
Figure 1 is a side elevation, partly in section, of the rotor of a gyroscope and certain of its connecting parts and parts of the body to be stabilized with which the gyroscope is connected. Only so much of the gyroscope and of the body to be stabilized is shown as is necessary for an understanding of my invention.
Figure 2:
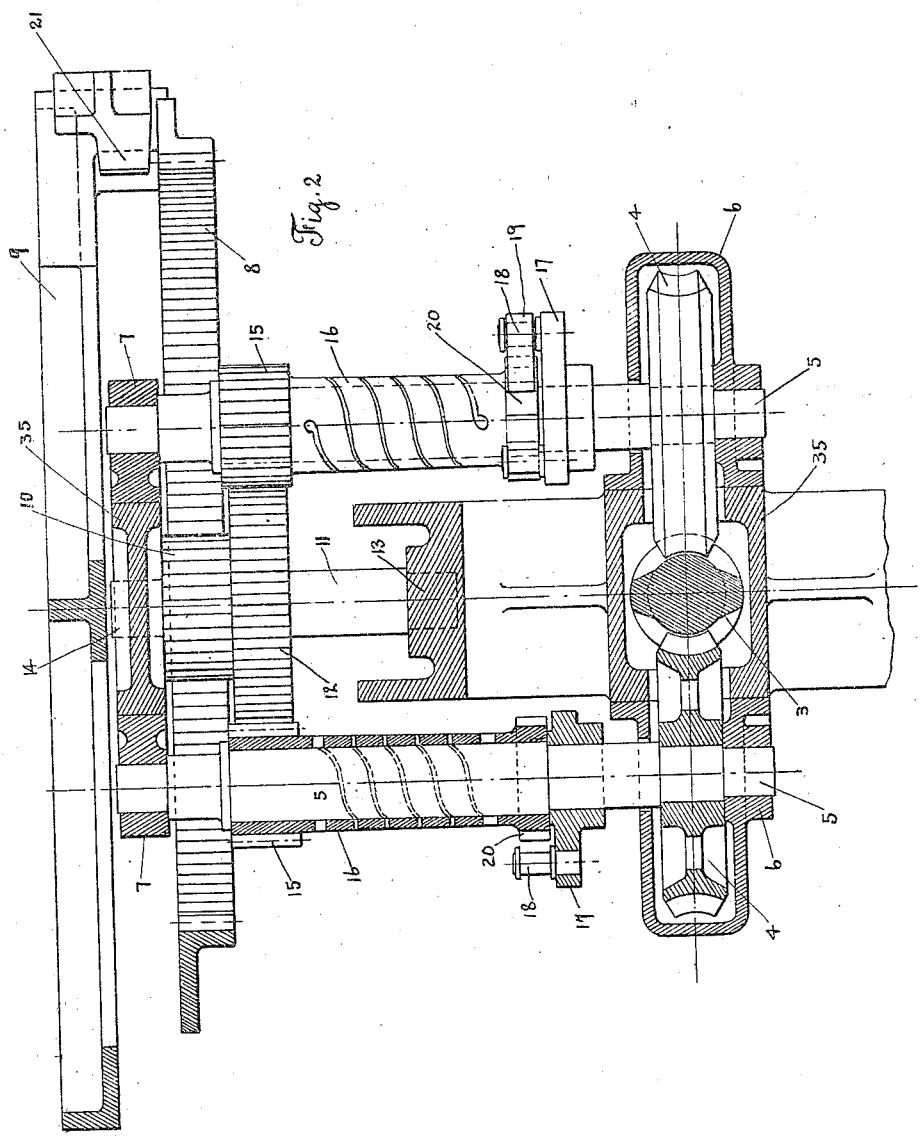
Fig. 2 is a horizontal section on the lines 2—2 of Fig. 1, viewed as shown by the arrows in Fig. 1.

Referring now specifically to the apparatus shown in Figs. 1 and 2, 1 represents the rotor of a gyroscope of the usual construction, and 2 the shaft upon which it is mounted. Certain parts of the gyroscope are omitted for the sake of clearness. Such omitted parts are of the usual construction. 3 is a worm gear on shaft 2, meshing with two worm wheels 4, 4, each fast on a shaft 5, 5. Worm wheels 4, 4, are of course driven in opposite directions by the rotor shaft. Shafts 5, 5, are carried in bearings in the parts 6, 7, which form part of the frame 35 of the gyroscope. 8 is a rack fixed to the stand 9, which stand is secured to the vessel to be stabilized and may be considered a part of it. This stand contains the gudgeon bearings (one shown dotted) of the gyroscope. 10 is a pinion, which, for convenience, I shall call the precession pinion, fast on shaft 11. 12 is a gear wheel, also fast on shaft 11. Shaft 11 is carried in bearings 13, 14, of the gyroscope frame. These parts precess with the gyroscope. Gear 12 meshes with pinions 15, 15. Each gear 15 is fast to a clutch sleeve 16, encircling and loose upon shaft 5. Each sleeve 16 forms a multiple clutch band, adapted, as hereinafter described, to clutch its shaft 5 and connect shaft 5 with gears 15, 12 and 10. Pinion 10 meshes with rack 8, and it will be understood that the pinion 10 and gears 12, 15, rotate only as the gyroscope precesses. Each shaft 5 has fast to it a disk 17, carrying three pins 18, projecting sidewise, and each carrying a pawl 19. These pawls are adapted, when moving in the right direction, to engage teeth on the ratchet wheel 20, fast on clutch sleeve 16.

As the gyroscope precesses, pinion 10 moves one way or the other over rack 8, and is caused to rotate one way or the other, rotating gears 12 and 15. In this operation, one gear 15 rotates in the same direction as its respective shaft 5 and disk 17. At first the teeth of gear 20 slip idly under the pawls 19, but as soon as the angular velocity of precession is such as to turn gear 15, through gears 12 and pinion 10, faster than shaft 5, pawls 19 engage the ratchet teeth of gear 20, and clutch band 16 frictionally clutches shaft 5 and gear 15 together. This couples the rotor and other precessing parts of the gyroscope to rack 8, or, in other words, to the body to be stabilized, in such a way that any precessional torque, or precessional moment, trying to further increase the precession velocity is transformed into spinning torque, tending to increase the speed of rotation of the rotor of the gyroscope. This automatic coupling takes place as soon as the angular velocity of precession of the gyroscope exceeds a predetermined amount. This amount is determined by the ratio of gearing between rotor and vessel and the speed of the rotor, and may be varied, or made to conform to the speed of the rotor, by making this ratio variable.

It will be seen that the coupling process described above is a limit or open coupling, the gyroscope being at any time perfectly free to precess at a lower velocity than that at which coupling takes place, the object of the device being to establish a positive limit for the precession velocity by causing the gyroscope to push against its own rotor. The resulting positive precession velocity limit is of the greatest importance for the safety and reliability of all parts of the gyroscope; it insures that the gyroscope precesses in phase with the oscillations of the body to be stabilized, and that a very large part of the energy absorbed by the gyroscope from the energy of oscillation of that body is transformed into spinning energy, resulting in a high stabilizing efficiency and a marked decrease of spinning power required from outside sources for spinning purposes, if such power is at all required after starting.

For the sake of clearness, only one pawl 19 is shown in connection with each disk 17, although, of course, it will be understood that the other pins 18 are similarly provided with pawls. It will also be noted that the pawls carry only part of the load, the clutch band 16 carrying the larger part of it. The coupling will, therefore, be a gradual one, eliminating shocks.

21, 21, are precessional limit stops mounted on the stand 9, and with them stops 22, 22, mounted on the frame of the gyroscope, are adapted to contact. These stops are required to limit the precession angles of the gyroscope. Any other suitable kind of stops or precession arc limits, than those shown, may be used with my control.

It will be understood that when the gyroscope is precessing in one direction, pinion 10 will be rotated one way, and when precessing in the other the pinion 10 will be rotated the other way. In one of these cases, only one of the set of gears 15, clutch 16, disk 17, with its pawls, will be operative, the other remaining idle. Details of the clutch band are not given in full, as they may be of any well-known variety.

The parts intervening between the rotor and the rotating parts of the gyroscope driven by it, or driving it, and the rack 8 of the body to be stabilized, such as gear 15, disk 17, multiple clutch band 16, etc., constitute a coupling device to connect the rotor of the gyroscope and the body to be stabilized. Any predetermined amount of angular velocity of precession may be selected at which such coupling is to take place. Of course, this point may be predetermined or be varied in any suitable way. As shown in the specific apparatus in question, it is done by adjusting the speed of the rotor.

It will thus be seen that the coupling device is normally inoperative until a predetermined angular velocity of precession of the gyroscope is reached, and that whenever and as long as such velocity tends to exceed the predetermined amount, the coupling device will become and remain operative to couple the rotor of the gyroscope and the body to be stabilized together, and whenever the angular velocity of precession falls below the predetermined amount, the coupling device will become inoperative and the gyroscope and the body to be stabilized will be uncoupled.

Any suitable means may be employed for preventing precession altogether. As such means are well known, they are not illustrated.

Figure 3:
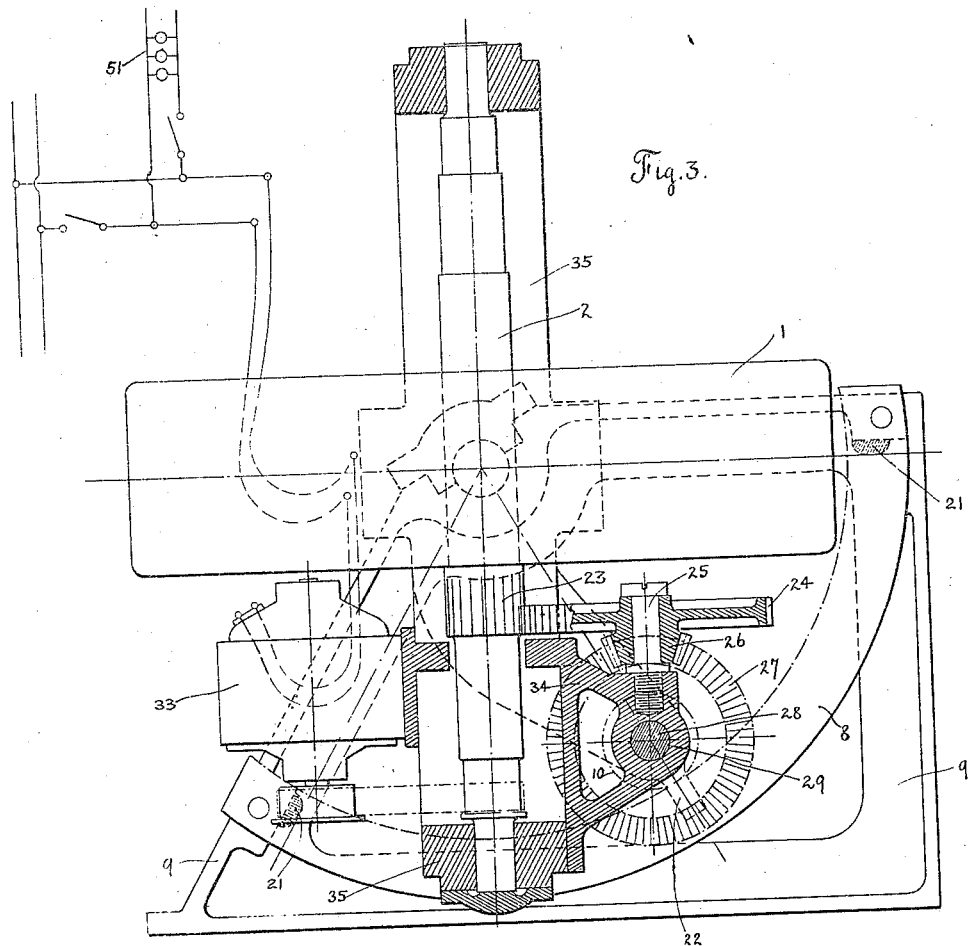
Fig. 3 is a side elevation, partly in section, of a modification of the apparatus shown in Fig. 1.

In Figs. 3 and 4, I have shown a modified form of apparatus. In these figures like parts are numbered the same as corresponding parts in Figs. 1 and 2.

In Figs. 3 and 4, shaft 2 is provided with a gear 23 in place of the worm, and it meshes with a spur-gear 24, loose on stationary shaft 25, secured to the gyroscope frame. Fast with gear 24 is a beveled pinion 26, also loose on shaft 25, and meshing with and rotating two beveled gears 27, 27, running loose on shaft 28, the latter mounted in bearings 29, 29, of the gyroscope frame. Precession pinion 10 is fast on shaft 28, and meshes with rack 8, fast to stand 9, forming part of the device to be stabilized. 30, 30, are friction pawls mounted on a plate 31, fast on shaft 28. When the angular velocity of precession of the gyroscope reaches and exceeds the predetermined amount, pinion 10, shaft 28 and disks 31, and their pawls, rotate faster, in the same direction, than one of the beveled gears 27, with a portion of which the pawls 30 engage, and tend to rotate these beveled gears, and, through them and connecting parts, rotor 1, faster in the same direction that it is rotating. The operation is the same as that described for Figs. 1 and 2, the difference being that in this case the coupling is entirely frictional.

It will be understood that the beveled gears 27, 27, rotate in opposite directions, and that, when one is operatively engaged by the coupling device, the other is not engaged, but runs loosely over the pawls 30 of the other disk 31.

32, 32, are the gudgeon bearings, mounted in the stand 9. 33 represents a spinning motor adapted to be connected in any suitable way to shaft 2. 34 is a bracket on the gyroscope frame carrying the fixed shaft 25 and bearing 29 of shaft 28.

If desired, a friction drive may be employed in place of gear 24, and the ratio of this gearing may be made variable, so as to permit of adjustment of the total gear ratio.

35 is the gyroscope frame.

Figure 7:
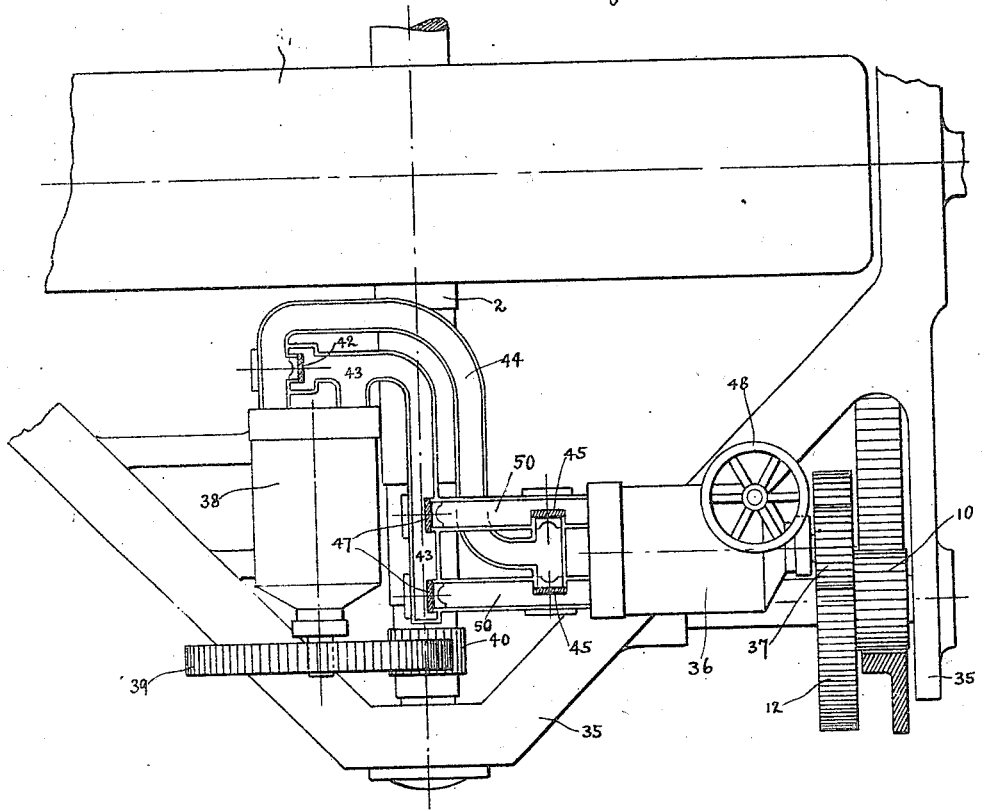
Fig. 7 is a diagrammatic view of a preferred form of my hydraulic control gear, with an adjustable gear ratio between the rotor and the vessel.

In Fig. 7, I have illustrated diagrammatically a scheme for a hydraulic control gear having an adjustable gear ratio between rotor and vessel. 36 is a variable-stroke hydraulic pump of any suitable description. It is mounted on the gyroscope frame 35, and precesses with it. The detail construction of this pump is not given, as it is well known. Gear 12, driven by precession pinion 10, meshes with a pinion 37, fast on the main shaft of pump 36. Pinion 37 drives pump 36. 38 is a hydraulic motor of any suitable construction, which may drive the rotor shaft 2 by gearing, or in any suitable way, or may be driven from that shaft. 39 and 40 represent the gearing connecting the motor and the shaft.

Valves 45 and 47 and their pipe connections are so arranged that, for any direction of precession, pump 36 draws fluid from pipe 44 and delivers fluid to pipe 43, pump 36 pumping into one or the other of the pipes 50, depending upon the direction of precession, whereas the motor 38 always takes fluid from pipe 43 and discharges into pipe 44. When not precessing, the entire fluid capacity of motor 38 passes through valve 42. As long as the precession velocity is below the point where the capacity of pump 36 equals that of the motor 38, part or all of the fluid discharged by motor 38 passes through pump 36. When, however, the capacity of pump 36 tends to exceed that of the motor, valve 42, which is spring-loaded, closes, and the resulting pressure of the fluid in pipe 43 drives motor 38. The fluid being incompressible, a conditional coupling between the body to be stabilized and the rotor of the gyroscope is obtained, adapted to transmit energy of oscillation to the rotor. Handwheel 48 allows adjustment of the capacity of pump 36 from zero to its maximum, in the well-known manner, and thereby adjustment of the ratio of coupling to suit any rotor speed or any period of oscillation of the body to be stabilized.

It is not essential that the pump be mounted on the gyroscope, suitable connections between it and the other coöperating parts of the apparatus being, of course, provided when it is mounted elsewhere.

It will be understood that the pawls shown in the various drawings are provided with springs tending to press them lightly against the ratchet teeth of the gears, in the well-known way. These are omitted from the drawings for the sake of clearness.

Any suitable means may be employed for spinning the rotor. As such means are well known, they are not illustrated.

Any suitable means, irrespective of the rotor speed, may be used for varying the amount of precession velocity at which the coupling device shall become operative, and the manner in which it becomes operative may be varied from the means shown on the drawings, and any suitable means, as electric, pneumatic or hydraulic, may be used to transform energy of oscillation into spinning energy. Such means are well known and, therefore, not illustrated.

By means of my improvement, the excess energy, over that required for spinning purposes, derived from the quenching of the oscillation of the body to be stabilized may be used in any suitable way for any suitable purpose. This may be done electrically or hydraulically, or in any suitable way.

In Fig. 3, I have shown a shunt-wound electric motor for driving the rotor. When the rotor has been accelerated to a certain amount of speed, the shunt-wound motor is automatically converted into a dynamo and will return current into the line in a well-known manner. This available electric current may be utilized for power and for other purposes. In Fig. 3, I have shown such use in connection with electric lamps 51.

Many modifications in or departures from the specific form of apparatus shown in the drawings may be made other than those specifically indicated without departing from my invention.

My improved system of control and apparatus possess many advantages. My improved apparatus is pendulic or self-centering, is uncontrolled or free from outside interference, its angular velocity of precession is closely limited, and, accordingly, the gyroscope always moves in harmony or in phase with the body being stabilized, and is, therefore, of high efficiency in quenching or limiting angular motion of such body; it is simple and rugged in construction and of relatively light weight, occupies little space for its operation, requires relatively little power to start it, as whatever energy the gyroscope takes out of the body to be stabilized is utilized for spinning purposes and is an addition to other means used for accelerating the rotor, and, when its rotor is brought up to speed, may be designed to be self-running; speed, may be designed to be self-running; it is, accordingly, cheap in initial cost and in operation; my improved apparatus is not liable to get out of control, and is, therefore, safe and free from the dangers attendant upon prior gyroscopic stabilizing devices; moreover, my improved apparatus requires no adjustment for changed conditions of the body to be stabilized, such as varying sea conditions, being self-adjusting to a marked degree, as its rotor speed will automatically adapt itself to such sea conditions; also, its rotor will be brought up to speed quickly by the sea itself when a large quenching power is most needed, whereas with prior gyroscopic stabilizers a large unquenched roll has made it very difficult to accelerate the rotor to its full speed, even by overloading the spinning motor to its limit, for a very long time.

My improved system of control is not confined to use with passive gyroscope stabilizers, but may, with suitable adaptations, be used with advantage with the active type as a precessional velocity limit control. In such a case, the outside motive power used for overcoming precession inertia, or for operating the clutches, need only be very small, may be derived from the rotor, and would be applied only during a small fraction of the duration of the precession, the power derived from the oscillation of the body being stabilized furnishing all the power needed.

It will, of course, be understood that my stabilizing apparatus may be located and arranged so as to quench or limit oscillations in any plane, such, for example, as the pitching of a vessel, as well as the rolling of a vessel; also that two or more gyroscopes may be coupled together to quench or limit the angular motion in one or different planes, as, for example, that of both rolling and pitching. If desired, my improved system of control can be installed in duplicate in connection with one gyroscope. Different ratios of coupling may be used, or the same ratio of coupling. In the first case, one ratio of coupling would be used at lower rotor speeds, and the other at higher speeds; when one is operative, the other is inoperative. Where both controls have the same ratio of coupling, they can be interlocked or be interdependent, one of them being made, in such a case, sufficiently elastic so that the load can be divided between them.

What I claim as new and desire to secure by Letters Patent is:—

1. The combination with a gyroscope and a body to be stabilized, of a coupling device adapted, whenever the angular velocity of precession of the gyroscope exceeds a predetermined amount, to couple the rotor of the gyroscope and the said body together to limit further increase of precessional angular velocity and to transform energy of oscillation into energy of rotation of the rotor of the gyroscope.

2. The combination with a gyroscope and a body to be stabilized, of a coupling device normally inoperative until a predetermined angular velocity of precession of the gyroscope is attained and then adapted to couple the gyroscope and the said body together to prevent further increase of precessional angular velocity and to transform energy of oscillation of the body into spinning energy or inertia of the rotor of the gyroscope, and adapted to uncouple them whenever the velocity of precession falls below such predetermined amount.

3. The combination with a gyroscope and a body to be stabilized, of a coupling device adapted, whenever the angular velocity of precession of the gyroscope exceeds a predetermined amount, to couple the rotor of the gyroscope and the said body together to limit further increase of precessional angular velocity and to transform energy of oscillation into energy of rotation of the rotor of the gyroscope, and means for converting such energy of rotation into energy suitable for some outside useful purpose.

4. The combination with a gyroscope and a body to be stabilized, of a coupling device adapted, whenever the angular velocity of precession of the gyroscope exceeds a predetermined amount, to couple the gyroscope and the said body together to limit further increase of precessional angular velocity and to transform energy of oscillation of the body into energy of rotation of the rotor of the gyroscope, and means to vary the ratio of such coupling and thereby the predetermined precession velocity at which coupling takes place.

5. The combination with a gyroscope and a body to be stabilized, of a coupling device carried by the gyroscope and adapted to precess with it and also connected with the body to be stabilized and adapted to respond to the oscillations of said body, the said coupling device being adapted, whenever the angular velocity of precession of the gyroscope exceeds a predetermined amount, to couple the gyroscope and the said body together to limit further increase of precessional angular velocity and to transform energy of oscillation into energy of rotation of the rotor of the gyroscope.

6. The combination of the rotor of a gyroscope, a body to be stabilized, a coupling device, connections between the said body and the coupling device adapted to rotate the latter one way or the other as the said body oscillates one way or the other, two rotating parts driven by the rotor of the gyroscope in opposite directions, the said rotating parts and the coupling device being so arranged and connected that neither of said rotating parts will be operatively connected with the coupling device until the angular velocity of precession of the gyroscope exceeds a predetermined amount, but when and so long as such angular velocity exceeds such amount the coupling device and one of the said rotating parts will be operatively connected, so that said coupling device will be operatively connected with that one of the said rotating parts rotating in the same direction as the coupling device, so that the coupling device will then tend to increase the speed of rotation of such rotating part and through it tend to increase the speed of rotation of the rotor.

7. The combination of a gyroscope capable of precessing through definite precession angles between two limiting stops mounted on a body to be stabilized, two precession-limiting stops mounted on the body to be stabilized, and a coupling device adapted in conjunction with said stops to secure precession of the gyroscope in phase with the oscillations of the body to be stabilized by utilizing the rotor of the gyroscope to absorb energy of oscillation of the body.

8. The combination of a gyroscope, a body to be stabilized, a coupling device connected with the said body and adapted to be rotated by it one way or the other as the said body oscillates one way or the other, and connections between the coupling device and the rotor of the gyroscope adapted, whenever the angular velocity of precession of the gyroscope exceeds a predetermined amount, to cause the coupling device to couple the rotor of the gyroscope and the said body together to limit further increase of precessional angular velocity and to transform any passive moment tending to increase the precession velocity beyond the predetermined amount into a torsional moment tending to increase the speed of rotation of the rotor of the gyroscope.

9. The combination of the rotor of a gyroscope, two rotating parts adapted to be driven thereby in opposite directions, a body to be stabilized, a rack mounted thereon, a precession device adapted to engage with and be rotated by the said rack in one direction or the other depending upon the direction of precession of the gyroscope, and connections between each of the said rotating parts and the precession device (including clutches), so constructed and arranged that until the precessional angular velocity of the gyroscope attains a certain predetermined amount the clutches will be inoperative to connect the precession device with either of the said rotating parts but whenever and as long as the precessional angular velocity exceeds the said predetermined amount one of said clutches will be operative to connect its rotating part with the precession device so as to cause the precession device to tend to increase the speed of such rotating part and through it the speed of the rotor.

10. The combination of the rotor of a gyroscope, two rotating parts adapted to be driven thereby in opposite directions, a body to be stabilized, a rack mounted thereon, a precession device carried by the frame of the gyroscope and precessing with the gyroscope and adapted to engage with and be rotated by the said rack in one direction or the other depending upon the direction of oscillation of the said body, and connections between each of the said rotating parts and the precession device, including clutches, so constructed and arranged that until the precessional angular velocity of the gyroscope attains a certain predetermined amount the clutches will be inoperative to connect the precession device with either of the said rotating parts but whenever and as long as the precessional angular velocity exceeds or tends to exceed the said predetermined amount one of said clutches will be operative to connect its rotating part with the precession device so as to cause the precession device to tend to increase the speed of such rotating part and through it the speed of the rotor.

11. The combination of a gyroscope, a body to be stabilized, and means adapted, whenever the angular velocity of precession of the gyroscope exceeds a predetermined amount, to transform energy of oscillation into rotary energy of the gyroscope.

12. The combination of a gyroscope, a body to be stabilized, and means normally inoperative until a predetermined angular velocity of precession of the gyroscope is attained but adapted to become operative, whenever such predetermined angular velocity is attained or exceeded, to transform energy of oscillation into energy of rotation of the rotor of the gyroscope.

13. The combination of a gyroscope, a body to be stabilized, and means adapted, whenever the angular velocity of precession of the gyroscope exceeds a predetermined amount, to transform energy of oscillation into energy of rotation of the rotor of the gyroscope, and means for converting such energy into energy for some outside useful purpose.

14. The combination of a gyroscope, a body to be stabilized, and means, carried by the gyroscope and adapted to precess with it, and adapted whenever the angular velocity of precession of the gyroscope exceeds a predetermined amount to transform energy of oscillation into energy of rotation of the rotor of the gyroscope.

15. The combination with a gyroscope of any type, of apparatus adapted to control the precession velocity of the gyroscope by utilizing the power-absorbing capacity of the rotor of the gyroscope for limiting and controlling the precession velocity.

16. The combination with a gyroscope and a body to be stabilized, of a precession velocity control device adapted to provide a definite precession velocity limit by coupling the rotor of the gyroscope to the body in such a way that energy of oscillation, tending to increase the precession velocity beyond its definite limit, is transformed into spinning energy.

17. The combination with a gyroscope and a body to be stabilized, of a coupling device adapted to automatically couple the rotor of said gyroscope to the body to be stabilized at a definite precession velocity, determined by the rotor speed and the ratio of coupling, and means to vary this ratio of coupling.

18. A gyroscope stabilizing device having a predetermined maximum limit to its angular velocity of precession controlled by the gyroscope itself.

19. The combination of a gyroscope and means automatically made operative by the gyroscope itself, whenever a predetermined angular velocity of precession is reached, to prevent further increase of angular velocity of precession.

20. The combination of a gyroscope and means automatically made operative by the gyroscope itself, whenever a predetermined angular velocity of precession is reached, to transform energy of oscillation into spinning energy of the rotor of the gyroscope.

In testimony whereof, I have signed my name to this specification.

CARL L. NORDEN.